United States Patent [19]

Masuda

[11] 3,975,177

[45] Aug. 17, 1976

[54] SYSTEM FOR PREVENTING CRACKING OF GLASS RIBBON IN PLATE GLASS MANUFACTURING

[75] Inventor: Hiroshi Masuda, Matsusaka, Japan

[73] Assignee: Central Glass Co., Ltd., Ube, Japan

[22] Filed: Nov. 13, 1975

[21] Appl. No.: 631,435

[30] Foreign Application Priority Data

Nov. 14, 1974 Japan .............................. 49-131341

[52] U.S. Cl. .......................................... 65/158; 65/28; 65/159; 65/160

[51] Int. Cl.[2] .......................................... C03B 18/02

[58] Field of Search ............. 65/158, 159, 160, 161, 65/162, 28

[56] References Cited

UNITED STATES PATENTS

| | | | |
|---|---|---|---|
| 3,223,502 | 12/1965 | Ward et al. | 65/162 X |
| 3,249,224 | 5/1966 | Uhlig | 209/111.7 |
| 3,533,704 | 10/1970 | Krenmayr | 356/198 |
| 3,607,193 | 9/1971 | Bourggraff et al. | 65/160 |
| 3,694,181 | 9/1972 | Dear | 65/162 X |

*Primary Examiner*—Arthur D. Kellogg
*Attorney, Agent, or Firm*—Lowe, King, Price & Markva

[57] ABSTRACT

A sensor laterally scans a glass ribbon, while it is advanced on a molten metal confined by a bath, by laser beam to detect an unmelted extraneous substance floating on the glass ribbon generating an electrical signal representative of the presence of the extraneous substance. Heating means, which is positioned in the vicinity of the exit of the bath, is automatically energized in response to the signal to prevent cracking of the glass ribbon due to the extraneous substance when it is picked up from the bath to roller conveyors of a lehr.

7 Claims, 3 Drawing Figures

SYSTEM FOR PREVENTING CRACKING OF GLASS RIBBON IN PLATE GLASS MANUFACTURING

This invention relates generally to a system for use in plate glass manufacturing, and particularly to a system for preventing cracking of a glass manufacturing when the glass ribbon is picked up from the surface of molten metal to roller conveyor of a lehr (sometimes spelled lear).

As is well known, in plate glass manufacturing, molten glass is poured through an orifice of a furnace on molten metal confined by a bath. The molten glass delivered to the bath spreads over the molten metal forming a continuous molten glass or a glass ribbon. The glass ribbon is advanced in contact with the surface of the molten metal and is then withdrawn by taking it up therefrom by appropriate rollers which lead to a lehr in which the glass ribbon is annealed. This picking-up operation of the glass ribbon from the bath is inevitable because of the side wall of the bath confining the molten metal. In the above, provided that the glass ribbon contains an unmelted extraneous substance which has in most cases a specific gravity smaller than the molten glass so that it is floating on the glass ribbon, then there is a possibility that the unmelted extraneous substance causes cracking in the glass ribbon when the glass ribbon is picked up from the bath to the lehr by roller conveyor. This is because the glass ribbon, which is closed during its advancement in the bath to be no longer in fluid state, is picked up in bending form, so that the cracking occurs in the glass ribbon in the vicinity of the unmelted extraneous substance. The cracking is furthermore strengthen by the fact that a coefficient of thermal expansion of glass is different from that of the unmelted extraneous substance.

To avoid the above-mentioned cracking, hitherto, an operator has constantly watched the surface of the glass ribbon with his naked eyes or through a television system in order to find the unmelted extraneous substance. When finding the extraneous substance, he energizes heating means being positioned in the vicinity of the exit of the bath to prevent the cracking by softening the portion of the glass ribbon surrounding the extraneous substance when it is picked up from the bath to the roller conveyor. However, there are encountered some defects in the above in that the operator may fail to find the extraneous substance and also the operator is required to have considerable experience to precisely determine the timing of energization of the heating means in consideration of the advancing velocity of the glass ribbon, etc.

The present invention is therefore directed to remove the defects by automatically detecting the unmelted extraneous substance to also automatically soften the glass ribbon at a place in the vicinity of the exit of the bath.

According to the present invention, there is provided a system for preventing cracking of the glass ribbon in plate glass manufacturing, which system comprises: scanning means for laterally scanning the glass ribbon by a laser beam emitting from a laser, while the glass ribbon is advanced on a molten metal confined by a bath, in order to detect at least one unmelted extraneous substance floating on the surface of the glass ribbon; converting means for receiving the laser beam reflected to convert the same into an electrical signal corresponding thereto, the reflected laser beam being changed in magnitude by the presence of the at least one unmelted extraneous substance; heating means being deposited in the vicinity of an exit of the bath for heating and softening the glass ribbon to prevent the cracking of the glass ribbon due to the unmelted extraneous substance when the glass ribbon is picked up from the bath to a roller conveyor; and controlling means for controlling energization of the heating means in response to the electrical signal representative of the presence of the at least one unmelted extraneous substance.

It is therefore an object of the present invention to provide a system for preventing cracking of a glass ribbon in plate glass manufacturing by automatically detecting an unmelted extraneous substance floating on a glass ribbon, which is advanced on molten metal, to also automatically soften the portion of the glass ribbon surrounding the substance by applying heat thereto when it is picked up from the surface of the molten metal to a roller conveyor of a lehr.

Additional objects as well as features and advantages of the invention will become evident from the detailed description set forth hereinafter when considered in conjunction with the accompanying drawings, wherein like parts in each of the several figures are identified by the same reference numerals, and wherein.

Figure 1:
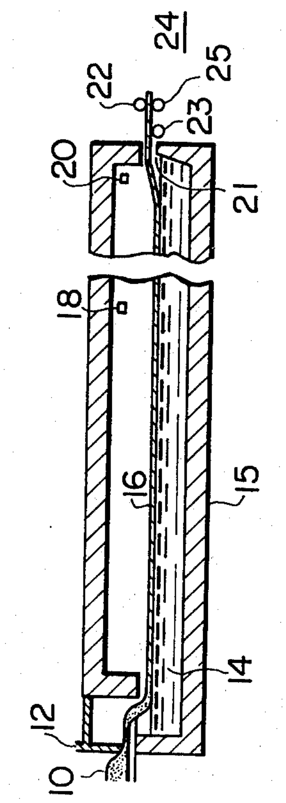
FIG. 1 shows an elevation in section of an apparatus together with portions of its peripheral devices for explanation of the present invention.

Reference is now made to FIG. 1, wherein there is schematically shown an elevation in section of a bath 15 together with portions of its peripheral devices for explanation of the present invention. Molten glass 10 is allowed to flow freely from a furnace (not shown) on molten metal, preferably molten tin, confined by a bath 15. The rate of flow of the molten glass 10 is controlled by a tweel 12. The delivered molten glass spreads over the molten metal 14 forming a continuous molten glass or a glass ribbon 16. The thickness of the glass ribbon 16 is determined by gravity and also by an interfacial or boundary tension between the glass ribbon 16 and the molten metal 14. The glass ribbon 16, as shown in FIG. 1, is withdrawn by taking it up from the surface of the molten metal 14 by appropriate rollers 22, 23 and 25 which lead to a lehr 24 (sometimes spelled lear) in which the glass ribbon is annealed.

As previously discussed, the present invention is directed to prevent cracking of the glass ribbon 16 due to the presence of an unmelted extraneous substance (not shown) when it is picked up to the rollers at an exit 21 of the bath 15. The unmelted extraneous substance has in most cases a specific gravity smaller than the molten glass so that is is floating on the glass ribbon. The presence of the extraneous subject tends to cause cracking of the glass ribbon at the picking-up operation at the exit 21. This is because the glass ribbon 16, which is cooled during its advancement in the bath 15 to be no longer in fluid state, is picked up in bending form as schematically shown in FIG. 1, so that the cracking occurs in the glass ribbon in the neighborhood of the unmelted extraneous substance. In the above, the cracking is strengthen by the fact that a coefficient of thermal expansion of the glass is different from that of the extraneous substance. To avoid this objectionable occurrence, it has been proposed to soften the glass ribbon surrounding the extraneous substance when it is picked up from the surface of the molten metal 14. The present invention is to provide a system for automatically detecting the unmelted extraneous substance by means of scanning means 18 to also automatically soften the glass ribbon by heating means 20 positioned in the vicinity of the exit 21.

Figure 2:
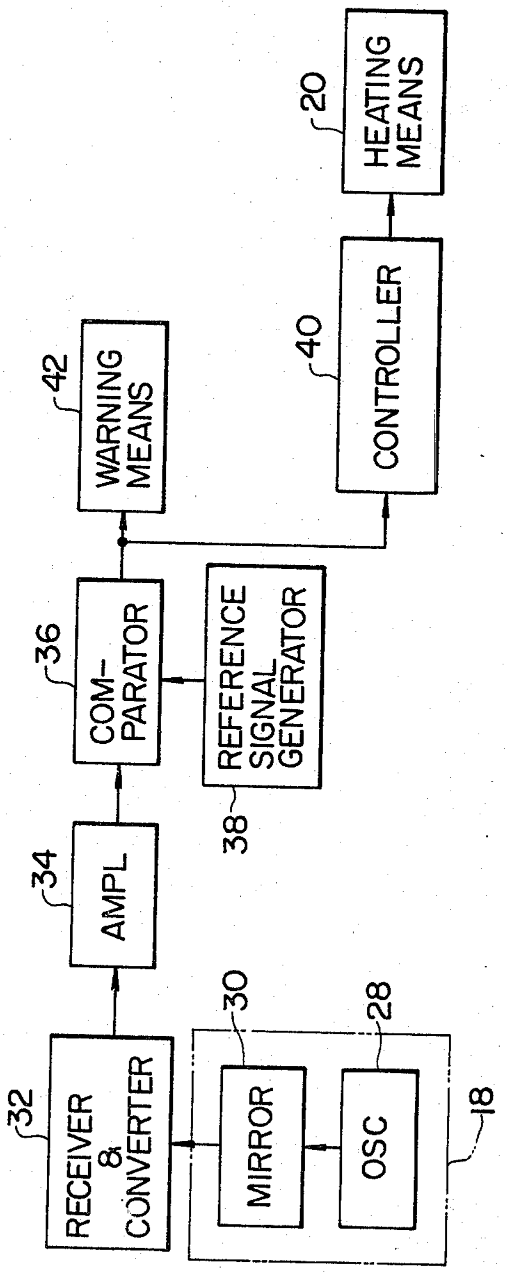
FIG. 2 shows a first preferred system embodying the present invention in a block diagram.

Turning to FIG. 2, wherein a first preferred system embodying the present invention is illustrated in a block diagram. The scanning means 18, which is provided over the glass ribbon 16 within the bath 15, consists of a conventional laser oscillator 28 and a mirror 30. The mirror 30 is arranged to be vibrated by suitable vibrating means (not shown) in such a manner as to receive a laser beam from the laser oscillator 28 laterally scanning the surface of the advancing glass ribbon 16. A receiver/converter 32, which is of a conventional type of photoelectric element, receives the laser beam reflected by the surface of the glass ribbon 16 converting the same into an electrical signal corresponding thereto. The electrical signal derived from the receiver/converter 32 changes in magnitude in the presence of a floating unmelted extraneous substance. In the above, the receiver/converter 32 is preferably provided with a filter which serves to reject unwanted light rays resulting from the molten glass and the molten metal, etc. The signal from the receiver/converter 32 is fed to an amplifier 34 to be amplified up to a predetermined level therein. The amplified signal is then applied to a comparator 36 which compares the applied signal with a reference signal being fed from a reference signal generator 38. The comparator 36 is designed to generate an electrical signal as a function of time in case the magnitude of the signal from the amplifier 34 is larger than that of the reference signal. This means that the generation of the signal from the comparator 36 indicates the presence of the unmelted extraneous substance which may invite the aforementioned undesirable cracking. In the above, the magnitude of the reference signal is previously determined in consideration of the followings: the magnitude of the amplified signal, the thickness of the glass ribbon, and the size of the extraneous substance which may cause the cracking, etc. This is because the system can accurately prevent the cracking without unnecessary heating operation. The reference signal is, however, changeable in magnitude by, for example, an operator in dependence of variation of thickness of the glass ribbon 16. Furthermore, the comparator 36 is preferably designed to generate an electrical signal whose magnitude corresponds to a difference value between the two signals applied thereto. The electrical signal thus derived from the comparator 36 is fed to a controller 40 to energize the heating means 20, and also fed to a warning device 42 to give an operator notice of energization of the heating means 20. The controller 40 is preferably designed to control the amount of heat in dependence of the magnitude of the signal applied, and also to control the timing of the energization of the heating means 20 on the basis of a signal representative of an advance velocity of the glass ribbon 16, which signal is generated by a suitable velocity detector (not shown in FIG. 1). Thus, in accordance with the first preferred embodiment of the present invention, the cracking of the glass ribbon 16 due to the unmelted extraneous substance can be avoided by softening the glass ribbon 16 when it is picked up from the bath 15 to the rollers 22, 23, and 25.

Figure 3:
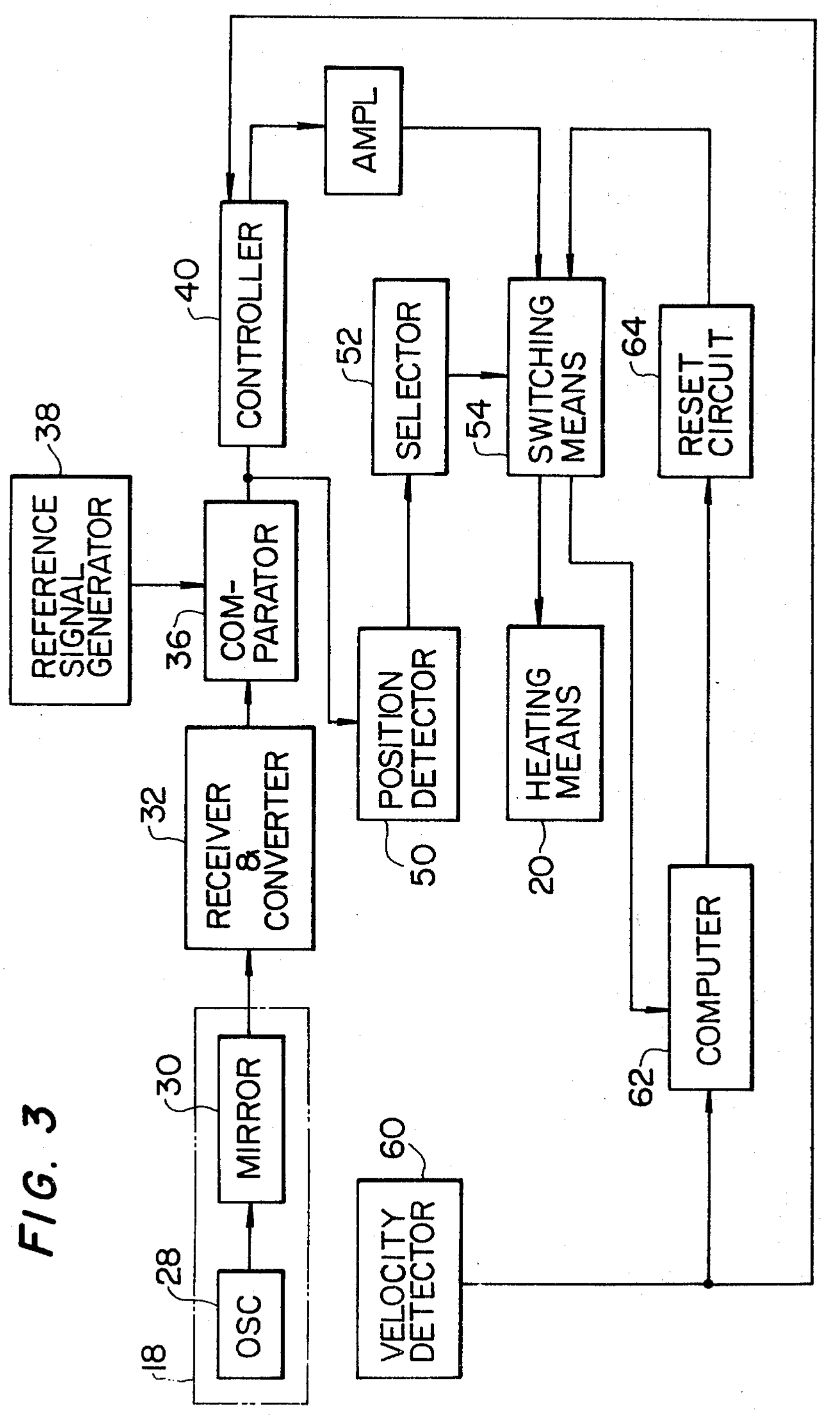
FIG. 3 shows a second preferred system embodying the present invention in a block diagram.

In FIG. 3, there is shown a second preferred system embodying the present invention in a block diagram. The scanning means 18, which is positioned over the glass ribbon 16 within the bath 15, consists of a conventional laser oscillator 28 and the mirror 30. The mirror 30, as previously mentioned in connection with FIG. 1, is arranged to be vibrated by suitable vibrating means (not shown) in such a manner as to receive a laser beam from the laser oscillator 28 scanning the surface of the advancing glass ribbon 16. The receiver/converter 32, which is of a conventional type of photoelectric element, receives the laser beam reflected by the surface of the glass ribbon 16 converting the same into an electrical signal corresponding thereto. The electrical signal derived from the receiver/converter 32 changes in magnitude in the presence of a floating unmelted extraneous substance. The signal from the receiver/converter 32 is fed to the comparator 36 which compares the applied signal with that of the reference signal fed from the reference signal generator 38. The comparator 36 is designed to generate an electrical signal as a function of time in case the magnitude of the signal from the receiver/converter 32 is larger than that of the reference signal, so that the generation of the signal from the comparator 36 indicates the presence of the unmelted extraneous substance which may cause the aforementioned undesirable cracking. The magnitude of the signal from the comparator 36 corresponds to a difference value between the two kinds of signals applied thereto. In the above, the magnitude of the reference signal is previously determined in consideration of the followings: the magnitude of the signal from the receiver/converter 32, the thickness of the glass ribbon, and the size of the extraneous substance which may cause the cracking, etc. This is because the system can accurately prevent the cracking without unnecessary heating operation. The reference signal is, however, changeable in magnitude by, for example, an operator in dependence of variation of the thickness of the glass ribbon 16. The electrical signal thus derived from the comparator 36 is fed to a position detector which determines a lateral position of the unmelted extraneous substance on the basis of the applied signal and generating an electrical signal representative thereof. In the above, the determination of the lateral position can be readily done because the signal from the comparator 36 represents the presence of the extraneous substance as a function of time. The signal from the position detector 50 is then fed to a selector 52 which selects, in dependence of the applied signal, one of a plurality of heaters laterally provided in alignment with respect to the glass ribbon 16 in the vicinity of the exit 21. The selector 52 generates an electrical signal indicative of the selected heater. This signal is then fed to switching means 54 operatively connected to the heating means 20, which includes the plurality of heaters, in order to select and close a switch of the switching means 54 operatively connected to the selected heater.

On the other hand, the electrical signal from the comparator 36 is fed to the controller 40 to which also fed is an electrical signal indicative of an advance velocity of the glass ribbon 16 from a velocity detector 60. The velocity detector 60 detects the advance velocity of the glass ribbon 16 by, for example, sensing rotational velocity of the rollers of the lehr 24. The controller 40 generates an electrical signal representative of informations determined on the basis of the two kinds of signals applied thereto: that is, timing of energization of the heating means 20, a duration of the energization, and the amount of heat supplied to the glass ribbon 16. The signal from the controller 40 is then fed to the amplifier 34 to be amplified up to a predetermined level. The amplified signal is applied to the heating means 20 through the switching means 54 to energize the selected heater. The switching means 54 generates an electrical signal indicative of an energization time of the heating means 20, which signal is fed to a computer 62. The signal from the velocity detector 60 is fed to the computer 62. The computer 62 computes timing of de-energization of the heating means 20 on the basis of the two kinds of signals applied thereto generating an electrical signal therefrom representative of the timing in question. The signal from the computer 62 is then fed to a reset circuit 64 which in turn generates an electrical signal representing an instruction of the de-energization and feeding the same to the switching means to de-energize the selected heater.

From the foregoing, it is understood that in accordance with the present invention the unmelted extraneous substance is automatically detected to also automatically control the heating means for preventing the cracking of the glass ribbon due to the extraneous substance when it is picked up from the bath to the roller conveyor of the lehr. Therefore, the preferred embodiments of the present invention can ensure a high yield rate and also elimination of labor in plate glass manufacturing.

What is claimed is:

1. System for preventing cracking of a glass ribbon in plate glass manufacturing, which comprises:

scanning means for laterally scanning the glass ribbon by a laser beam emitting from a laser, while the glass ribbon is advanced on a molten metal confined by a bath, in order to detect at least one unmelted extraneous substance floating on the surface of the glass ribbon;

converting means for receiving the laser beam reflected to convert the same into a first electrical signal corresponding thereto, the reflected laser beam being changed in magnitude by the presence of the at least one unmelted extraneous substance;

heating means being deposited in the vicinity of an exit of the bath for heating and softening the glass ribbon to prevent the cracking of the glass ribbon due to the unmelted extraneous substance, when the glass ribbon is picked up from the bath to a roller conveyor; and controlling means for controlling energization of the heating means in response to the first electrical signal representative of the presence of the at least one unmelted extraneous substance.

2. System claimed in claim 1, further comprising a velocity detector for detecting an advancing velocity of the glass ribbon on the molten metal to generate a second electrical signal corresponding thereto, said controlling means receiving the second electrical signal to time the energization of the heating means.

3. System claimed in claim 2, further comprising:

reference signal generator for generating a reference signal;

a comparator connected to the converting means and receiving the first electrical signal therefrom and comparing the magnitude of the reference signal with that of the first electrical signal to generate a third electrical signal representative of a difference value therebetween as a function of time in case the latter is larger than the former.

4. System claimed in claim 3, wherein the reference signal is variable in magnitude in accordance with the thickness of the glass ribbon advancing on the molten metal.

5. System claimed in claim 4, wherein the heating means includes a plurality of heaters laterally provided in alignment with respect to the glass ribbon.

6. System claimed in claim 5, further comprising:

position detector connected to the comparator and receiving the third electrical signal therefrom for measuring a lateral position of the at least one unmelted extraneous substance on the basis of the third electrical signal, and generating a fourth electrical signal indicative of the lateral position;

a selector connected to the position detector and receiving the fourth electrical signal for selecting at least one heater to be energized from the plurality of the heaters on the basis of the fourth signal.

7. System claimed in claim 6, further comprising:

a computer connected to the velocity detector and receiving the second signal therefrom for computing a time when the portion of the glass ribbon surrounding the at least one extraneous substance is completely transferred to the roller conveyor, and generating a fifth electrical signal representative thereof;

a reset circuit connected to the computer and receiving the fifth electrical signal for resetting switching means operatively connected to the heating means.

* * * * *